(12) United States Patent
Dubson

(10) Patent No.: US 6,604,925 B1
(45) Date of Patent: Aug. 12, 2003

(54) DEVICE FOR FORMING A FILTERING MATERIAL

(75) Inventor: Alexander Dubson, Migdal Haemek (IL)

(73) Assignee: Nicast Ltd., Caesarea (IL)

( * ) Notice: Subject to any disclaimer, the term of this patent is extended or adjusted under 35 U.S.C. 154(b) by 0 days.

(21) Appl. No.: 09/326,559

(22) Filed: Jun. 7, 1999

Related U.S. Application Data

(63) Continuation-in-part of application No. PCT/IL97/00403, filed on Dec. 9, 1997.

(30) Foreign Application Priority Data

Dec. 11, 1996 (IL) ................................................. 119809

(51) Int. Cl.$^7$ ................................................. B05D 5/02
(52) U.S. Cl. ........................... 425/6; 425/8; 425/174.6; 425/174.8 R; 264/6; 442/340
(58) Field of Search ........................ 425/6, 80.1, 83.1, 425/174.6, 174.8 E, 174.8 R, 8; 264/484, 413, 6; 442/340

(56) References Cited

U.S. PATENT DOCUMENTS

| | | | |
|---|---|---|---|
| 1,975,504 A | 10/1934 | Formhals | 264/10 |
| 2,349,950 A | 5/1944 | Formhals | 264/10 |
| 2,466,906 A | 4/1949 | Miller | 264/437 |
| 2,491,889 A | 12/1949 | Bennett et al. | 65/529 |
| 2,810,426 A | 10/1957 | Till et al. | 264/438 |
| 3,280,229 A | 10/1966 | Simons | 264/10 |
| 3,994,258 A | 11/1976 | Simm | 118/626 |
| 4,043,331 A | 8/1977 | Martin et al. | 602/45 |
| 4,127,706 A | 11/1978 | Martin et al. | 429/122 |
| 4,178,157 A | 12/1979 | Van Turnhout et al. | 96/99 |
| 4,230,650 A | 10/1980 | Guignard | 264/441 |
| 4,874,659 A | 10/1989 | Ando et al. | 428/221 |
| 4,904,174 A | 2/1990 | Moosmayer et al. | 425/174.8 E |
| 4,908,165 A * | 3/1990 | Kramer et al. | 264/22 |
| 5,264,989 A * | 11/1993 | Bauer | 361/225 |
| 5,554,722 A | 9/1996 | Eichenauer et al. | 528/340 |
| 5,558,809 A * | 9/1996 | Groh et al. | 252/62.54 |
| 5,726,107 A | 3/1998 | Dahringer et al. | 442/414 |

* cited by examiner

Primary Examiner—Robert Davis
Assistant Examiner—Joseph S Del Sole
(74) Attorney, Agent, or Firm—G.E. Ehrlich (1995) Ltd.

(57) ABSTRACT

A device for producing a porous fiber structure. One or more points of high surface curvature is produced in a liquefied polymer, such as a polymer solution or a polymer melt. The points of high surface curvature may be produced by forcing the liquefied polymer through narrow nozzles, or by wetting sharp protrusions with the liquefied polymer. The liquefied polymer is charged to a high negative electrical potential relative to a grounded moving belt. Thin jets of liquefied polymer emerge from the points of high surface curvature to impinge as fibers on the moving belt, thereby forming a nonwoven fiber structure of relatively uniform porosity. A powdered aerosol is charged to a high positive electrical potential relative to the moving belt. As the belt moves past the aerosol, the aerosol particles are attracted to fill interstices in the fiber structure, thereby creating a composite filtering material.

18 Claims, 10 Drawing Sheets

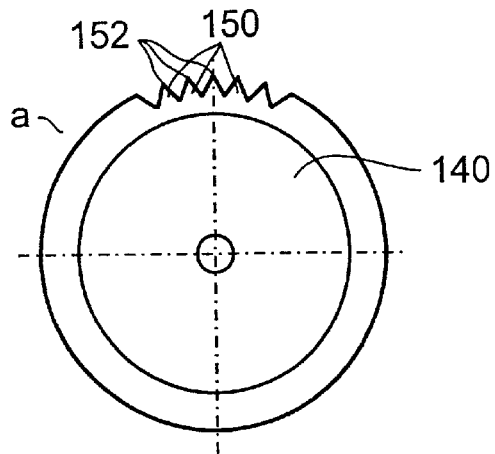
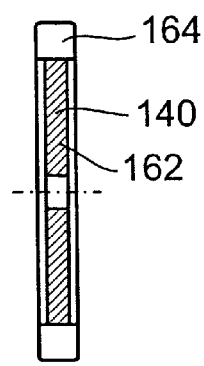
Fig. 12a  Fig. 12b
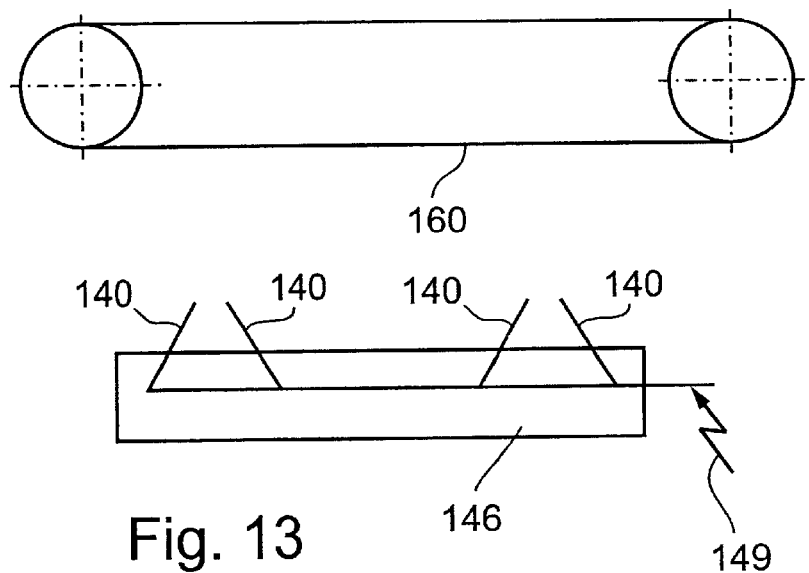
Fig. 13
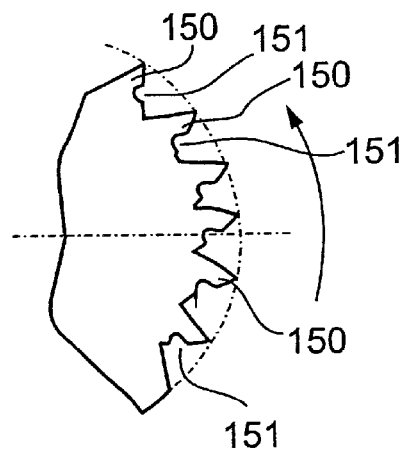
Fig. 14

DEVICE FOR FORMING A FILTERING MATERIAL

This is a continuation-in-part of PCT/IL97/00403, filed Dec. 9, 1997.

FIELD AND BACKGROUND OF THE INVENTION

The present invention is related to filtering means, in particular to composite polymeric fiber filters, and to the technology for their manufacture.

The creation of filtering materials capable of trapping particles of 0.1–10 microns in size and their increasing use is related to increasingly stringent requirements for quality and reliability of manufactured commodities, as well as to the rapid development of modern technology and production processes, such as, but not limited to, electronics, aviation, automobile industry, electrochemical industry, biotechnology, medicine, etc.

The main industrial manufacturing methods for such materials include production from polymer solutions (V. P. Dubyaga et al., *Polymer Membranes*, "Chemistry" Publishing House, Moscow, 1981 (in Russian); V. E. Gul and V. P. Dyakonova, *Physical and Chemical Principles of Polymer Films Manufacture*, "Higher School Publishing House, Moscow, 1978 (in Russian); German patent DE 3,023,788, "Cationic absorbent for removing acid dyes etc. From waste water—prepared from aminoplast precondensate and amine-amide compound"), from powders and powder polymer composites (P. B. Zhivotinskiy, *Porous Partitions and Membranes in Electrochemical Equipment*, "Chemistry" Publishing House, Leningrad, 1978 (in Russian); *Encyclopedia of Polymer Science and Engineering*, Wiley, N.Y., 1987, Vol. 8 p. 533), from macromonolithic films (I. Cabasso and A. F. Turbak, "Synthetic membranes", Vol. 1, ACS *Symposium, Ser.* 154, Washington D.C., 1981, p. 267), and from fibers and dispersions of fibrous polymers (T. Miura, "Totally dry unwoven system combines air-laid and thermobonding technology", *Unwoven World Vol.* 73 (March 1988) p.46). The latter method is the most widespread, since it facilitates the manufacture of materials with the optimal cost-quality ratio.

Great interest is also being expressed in the extension of the traditional uses of filtering, materials, especially to combination functions of trapping micro-particles in gaseous and liquid media with the adsorption of molecular admixtures, for example, in the removal of mercaptans, as substrate for catalytic reactions, in the enhancement of the bactericidal effect of the filtering material, etc. Fulfillment of these additional functions is possible due to the introduction into the fiber matrix of fillers of some sort or functional groups giving the formation of additional solid phase, i.e., as a result of manufacturing of composite filtering materials.

At present, high efficiency polymeric filtering materials are manufactured from synthetic fibers by means of a technology that is similar in many aspects to the traditional technology applied in the pulp and paper industry. A long fiber thread is cut into pieces of a given length, which are then subjected to some basic and supplementary operations out of more than 50 possibilities, which may include chemical processing for modification of surface properties, mixing with binding and stabilizing compositions, calendaring, drying process, etc. (O. I. Nachinkin, *Polymer Microfilters*, "Chemistry" Publishing House, Moscow, 1985 (in Russian), pp. 157–158). The complexity of such a technological process hampers the manufacture of materials with stable characteristics for subsequent exploitation; results in the high cost of manufactured filtering materials; and practically excludes the manufacture of composites with fillers sensitive to moist, thermal processing.

Low efficiency filtering materials (class ASHRAE) are manufactured by melt blow or spun-bonded processes.

There is, however, a method for the manufacture of ultra-thin synthetic fibers (and devices for their production), which facilitates the combination of the process of fiber manufacture with the formation of a microporous filtering material, and thus reduces the number of technological operations, precludes the necessity for aqueous reaction media, and increases the stability of properties of the product being manufactured (see, for example, U.S. Pat. No. 2,349, 950). According to this method, known as "electrocapillary spinning", fibers of a given length are formed during the process of polymer solution flow from capillary apertures under electric forces and fall on a receptor to form an unwoven polymer material, the basic properties of which may be effectively changed.

With this method, fiber formation takes place in the gaps between each capillary, being under negative potential, and a grounded antielectrode in the form of a thin wire, i.e., in the presence of a heterogeneous field, being accompanied by corona discharge. However, the process of solvent evaporation takes place very rapidly, and as a result the fiber is subjected to varying electric and aerodynamic forces, which leads to anisotropy along the fiber width and formation of short fibers.

Manufacture of high-quality filtering materials from such fibers is thus impossible because the electric charge of the fibers is low, such that the process of forming the filtering material is not controlled by electrical force and consequently the filtering material is not uniform.

Exploitation of a device for executing the method described above is complicated by a number of technological difficulties:

1. Capillary apertures become blocked by polymer films that form under any deviation from the technological process conditions—concentration and temperature of solution, atmospheric humidity, intensity of electric field, etc.

2. The presence of a large number of such formations leads to a complete halt of the technological process or drops form as a consequence of the rupture of the aforementioned films.

3. The presence of high intensity electric field in the area of the precipitation electrode limits the productivity of the method.

Therefore, the manufacture of synthetic fibers by this method is possible from only a very limited number of polymers, for example, cellulose acetate and low molecular weight polycarbonate, which are not prone to the defects described above.

It is necessary to take into account the fact that such an important parameter of filtering materials as monodispersity of the pores (and the resultant separation efficiency of the product) has, in this case, a weak dependency on fiber characteristics and is largely determined by the purely probabilistic process of fiber stacking.

Modern filtering materials are subject to strict, frequently contradictory, requirements. In addition to high efficiency of separation of heterogeneous liquid and gas systems, they are required to provide low hydro- (or aero-) dynamic resistance of the filter, good mechanical strength and technical properties (e.g., pleatability), chemical stability, good dirt absorption capacity, and universality of application, together with low cost.

The manufacture of such products is conditional on the use of high-quality long and thin fibers with an isometric cross-section, containing monodispersed pores and exhibiting high porosity. The practical value of this product may be greatly increased as possible applications are expanded due to the formation of additional phases, i.e., in the manufacture of the above-mentioned composite filtering materials.

At present there is a high demand to high efficiency particulate air (HEPA) filters which are defined as capable of filtering out 99.97% of 0.3 µm particulates in air flowing at 5 cm/sec. Such a requirement is met, for example, by glass-fiber based filters, however on the expense of a high pressure drop, in a range of 30–40 mm $H_2O$.

U.S. Pat. Nos. 4,874,659 and 4,178,157 both teach high efficiency particulate air filters capable of filtering out 99.97% of 0.3 µm particulates in air flowing at 5 cm/sec, characterized by lower pressure drop in a range of 5–10 mm $H_2O$. These filters are made of nonwoven web (U.S. Pat. No. 4,874,659) or sliced films (U.S. Pat. No. 4,178,157) made of polyolefines, such as polyethylene or polypropylene, which are partially melted by heating to about 100° C. and are thereafter subjected to an immense electrical field which electrically charges the polymer. The result is a filter media, characterized by thick fibers (10–200 µm) in diameter, low porosity and being electrically charged. The latter property, provides these filters with the high efficiency particulate air (HEPA) qualities. However, such filters suffer few limitations. First, being based on the electrical charge for effective capture of particulates, the performances of such filters are greatly influenced by air humidity, causing charge dissipation. Second, due to their mode of action and to being relatively thin, such filters are characterized by low dust load (the weigh of dust per area of filter causing a two fold increase in pressure drop) per filter weight per area ratio of about 0.8, wherein typically the dust load of such filters is about 50–80 $g/m^2$ and their weight per area is about 80–130 $g/m^2$.

Therefore, the main objective of the proposed technical solution is removal of the above-listed defects of known solutions for filtering applications (primarily directed at the manufacture of microfilters from polymer fibers) and other purposes, including application as micro-filtering means, i.e., the creation of means and the meeting of the above-listed requirements for technical means for the manufacture of micro-filtering materials with new consumer properties.

SUMMARY OF THE INVENTION

According to one aspect of the present invention there is provided a device for transforming a liquefied polymer into a fiber structure, including (a) a substantially planar precipitation electrode; (b) a first mechanism for charging the liquefied polymer to a first electrical potential relative to the precipitation electrode; (c) a second mechanism for forming a surface on the liquefied polymer of sufficiently high curvature to cause at least one jet of the liquefied polymer to be drawn by the first electrical potential to the precipitation electrode; wherein the first and second mechanisms are designed such that when a plurality of fibers are precipitated on the precipitation electrode, a high efficiency particulate air unwoven fiber structure, capable of filtering out 99.97% of 0.3 µm particulates in air flowing at 5 cm/sec is obtainable.

According to further features in preferred embodiments of the invention described below, the first mechanism for charging the liquefied polymer to a first electrical potential relative to the precipitation electrode includes in combination (i) a source of high voltage; and (ii) a charge control agent mixed with the liquefied polymer.

According to still further features in the described preferred embodiments the first mechanism for charging the liquefied polymer to a first electrical potential relative to the precipitation electrode further includes (iii) a source of ionized air being in contact with the liquefied polymer.

According to still further features in the described preferred. embodiments the second mechanism is effected by at least one rotating wheel having a rim formed with a plurality of protrusions.

According to still further features in the described preferred embodiments each of the protrusions is formed with a liquefied polymer collecting cavity.

According to still further features in the described preferred embodiments each of the at least one wheel is tilted with respect to the precipitation electrode.

According to still further features in the described preferred embodiments each of the at least one wheel includes a dielectric core.

According to still further features in the described preferred embodiments the second mechanism is effected by a gas bubbles generating mechanism.

According to still further features in the described preferred embodiments the second mechanism is effected by a rotating strap formed with a plurality of protrusions.

The basic device of the present invention includes a grounded moving belt that acts as a precipitation electrode, and an electrode-collector for charging a polymer solution negatively with respect to the moving belt and for producing areas of high surface curvature in the polymer solution.

In one embodiment of the device, the areas of high surface curvature are formed by forcing the polymer solution through a bank of nozzles. The nozzles of the electrode-collector are inserted lengthwise in cylindrical holes sited at intervals in a negatively charged cover plate of the electrode-collector. The source of solvent vapors is connected to the holes. In an alternative configuration, the nozzles are connected by a system of open channels to the solvent vessel.

In one of the implementations, the device is provided with an additional grounded electrode (or alternatively an under potential electrode, of the same polarity of the high voltage electrode, but with lower voltage) which is placed in parallel to the surface of the nozzles of the electrode-collector and which is able to move in the direction normal to the plane of the electrode-collector's nozzles.

In order to improve the manufacturing process, the additional electrode may take the form of a single wire stretched over the inter-electrode space.

The additional electrode may also take the form of a perforated plate with flange, in which case the surface of the additional electrode, the flange, and the electrode-collector form a closed cavity, and the apertures of the perforated plate are co-axial to the apertures of electrode-collector.

Preferably, a device of the present invention also includes an aerosol generator, made in the form of a hollow apparatus (fluidized bed layer) divided into two parts by a porous electro-conducting partition, which is connected to a mainly positive high-voltage source. The lower part of the cavity forms a pressure chamber, which is connected to a compressor, and the upper part of the cavity is filled with the dispersible filler, for example, polymer powder.

Alternatively, the aerosol generator may be made in the form of a slot sprayer, connected to a positive high-voltage source and a dry fluid feeder, provided with an ejector for supplying powder to the sprayer.

Secondly, the objective put forward in the current invention is obtained by the suggested method of manufacturing of a composite filtering material, stipulating the following operations (stages) (a) preparation of a polymer solution from a polymer, an organic solvent and solubilizing additives, for example, by mixing at elevated temperatures; (b) pouring the polymer solution into the electrode-collector and introducing the dispersible filler, for example, from a polymer of the same chemical composition as that in the solution, into the cavity of electrified aerosol generator; (c) supply of negative high voltage to the electrode-collector, and creation of hydrostatic pressure to facilitate ejection of the polymer solution through the electrode-collector nozzles to produce polymer fibers with a negative electric charge; (d) transfer of the aforementioned fibers under the action of electric and, inertial forces to the precipitation electrode and chaotic stacking of the fibers on its surface to transform the fibers into an unwoven polymer material; (e) displacement of above-described polymer material with the help of the precipitation electrode, followed by interaction of the polymer material with the electrified aerosol cloud formed from the dispersible filler in the aerosol generator under positive high voltage and air pressure, accompanied by penetration of the aerosol cloud into the structure of the negatively charged unwoven polymer material to form a homogeneous composite filtering material.

Thus, according to another aspect of the present invention there is provided a method for forming a polymer into a high efficiency particulate air unwoven fiber structure capable of filtering out 99.97% of 0.3 µm particulates in air flowing at 5 cm/sec, comprising the steps of (a) liquefying the polymer, thereby producing a liquefied polymer; (b) supplementing the liquefied polymer with a charge control agent; (c) providing a precipitation electrode; (d) charging the liquefied polymer to a first electrical potential relative to the precipitation electrode; and (e) forming a surface on the liquefied polymer of sufficiently high curvature to cause at least one jet of the liquefied polymer to be drawn to the precipitation electrode by the first electrical potential difference, thereby forming the unwoven fiber structure capable of filtering out 99.97% of 0.3 µm particulates in air flowing at 5 cm/sec on the precipitation electrode.

According to further features in preferred embodiments of the invention described below, the liquefying is effected by dissolving the polymer in a solvent, thereby creating a polymer solution.

According to still further features in the described preferred embodiments the method further comprising the step of (f) providing vapors of the solvent proximate to the surface of high curvature.

According to still further features in the described preferred embodiments the charge control agent is selected from the group consisting of biscationic amides, phenol and uryl sulfide derivatives, metal complex compounds, triphenylmethanes, dimethylmidazole and ethoxytrimethylsians.

According to still further features in the described preferred embodiments the forming of the surface of high curvature is effected by causing the liquefied polymer to emerge from a nozzle, the surface of high curvature being a meniscus of the liquefied polymer.

According to still further features in the described preferred embodiments the forming of the surface of high curvature is effected by wetting a protrusion having a tip with the liquefied polymer, the surface of high curvature being a surface of the liquefied polymer adjacent to the tip.

According to still further features in the described preferred embodiments the method further comprising the step of (f) moving the precipitation electrode so that the unwoven fiber structure is formed on the precipitation electrode as a sheet.

According to still further features in the described preferred embodiments the method further comprising the step of (f) vibrating the surface of high curvature.

According to still further features in the described preferred embodiments the vibrating is effected at a frequency between about 5000 Hz and about 30,000 Hz.

According to still further features in the described preferred embodiments charging the liquefied polymer to a first electrical potential relative to the precipitation electrode is followed by recharging the liquefied polymer to a second electrical potential relative to the precipitation electrode, the second electrical potential is similar in magnitude, yet opposite in sign with respect to first electrical potential. Preferably the s charge is oscillated between the first and second electrical potentials in a frequency of about 0.1–10 Hz, preferably about 1 Hz.

According to still further features in the described preferred embodiments the method further comprising the steps of (f) charging a filler powder to a second electrical potential relative to the collection surface, the second electrical potential being opposite in sign to the first electrical potential, thereby creating a charged filler powder; and (g) exposing the unwoven fiber structure on the precipitation electrode to the charged powder, thereby attracting the charged filler powder to the unwoven fiber structure.

According to still further features in the described preferred embodiments the method further comprising the steps of (f) supplementing the liquefied polymer with an additive selected from the group consisting of a viscosity reducing additive, a conductivity regulating additive and a fiber surface tension regulating additive.

According to still further features in the described preferred embodiments the viscosity reducing additive is polyoxyalkylein, the conductivity regulating additive is an amine salt and the fiber surface tension regulating additive is a surfactant.

According to still further features in the described preferred embodiments the liquefied polymer is charged negatively relative to the precipitation electrode and wherein the charged powder is charged positively relative to the precipitation electrode.

According to still another aspect of the present invention there is provided a high efficiency particulate air filter comprising unwoven fibers of a polymer, the filter being capable of filtering out at least 99.97% of 0.3 µm particulates in air flowing at 5 cm/sec and having a pressure drop of about 0.75 mm $H_2O$ to about 13 mm $H_2O$.

According to still further features in the described preferred embodiments the filter is substantially electrically neutral.

According to still further features in the described preferred embodiments the, fibers have a diameter of about 0.1 µm to about 10 µm According to yet another aspect of the present invention there is provided a high efficiency particulate air filter comprising unwoven fibers of a polymer, the filter being capable of filtering out at least 99.97% of 0.3 µm particulates in air flowing at 5 cm/sec and having a pressure drop of about 0.75 mm $H_2O$ to about 13 mm $H_2O$, wherein at least about 90% of the fibers having a diameter in a range of X and 2X, where X is in a range of about 0.1 µm and about 10 µm.

According to still another aspect of the present invention there is provided a high efficiency particulate air filter comprising unwoven, fibers of a polymer, the filter being capable of filtering out at least 99.97% of 0.3 μm particulates in air flowing at 5 cm/sec and having a pressure drop of about 0.75 mm H$_2$O to about 13 mm H$_2$O, the filter featuring pores formed among the fibers, wherein at least about 90% of the pores having a diameter in a range of Y and 2Y, where Y is in a range of about 0.2 μm and about 10 μm.

BRIEF DESCRIPTION OF THE DRAWINGS

The invention is herein described, by way of example only, with reference to the accompanying drawings, wherein:

FIG. 2b is a lateral cross section of the electrode-collector of FIG. 2a;

FIGS. 12a–b are side view and cross section of a wheel according to a preferred embodiment of the invention, including a dielectric core;

FIG. 13 is a cross section of a device according to the present invention including a plurality of tilted circular wheels in a different configuration;

FIG. 14 is a side view of a wheel according to a preferred embodiment of the invention, including liquefied polymer collecting cavities.

DESCRIPTION OF THE PREFERRED EMBODIMENTS

Figure 1:
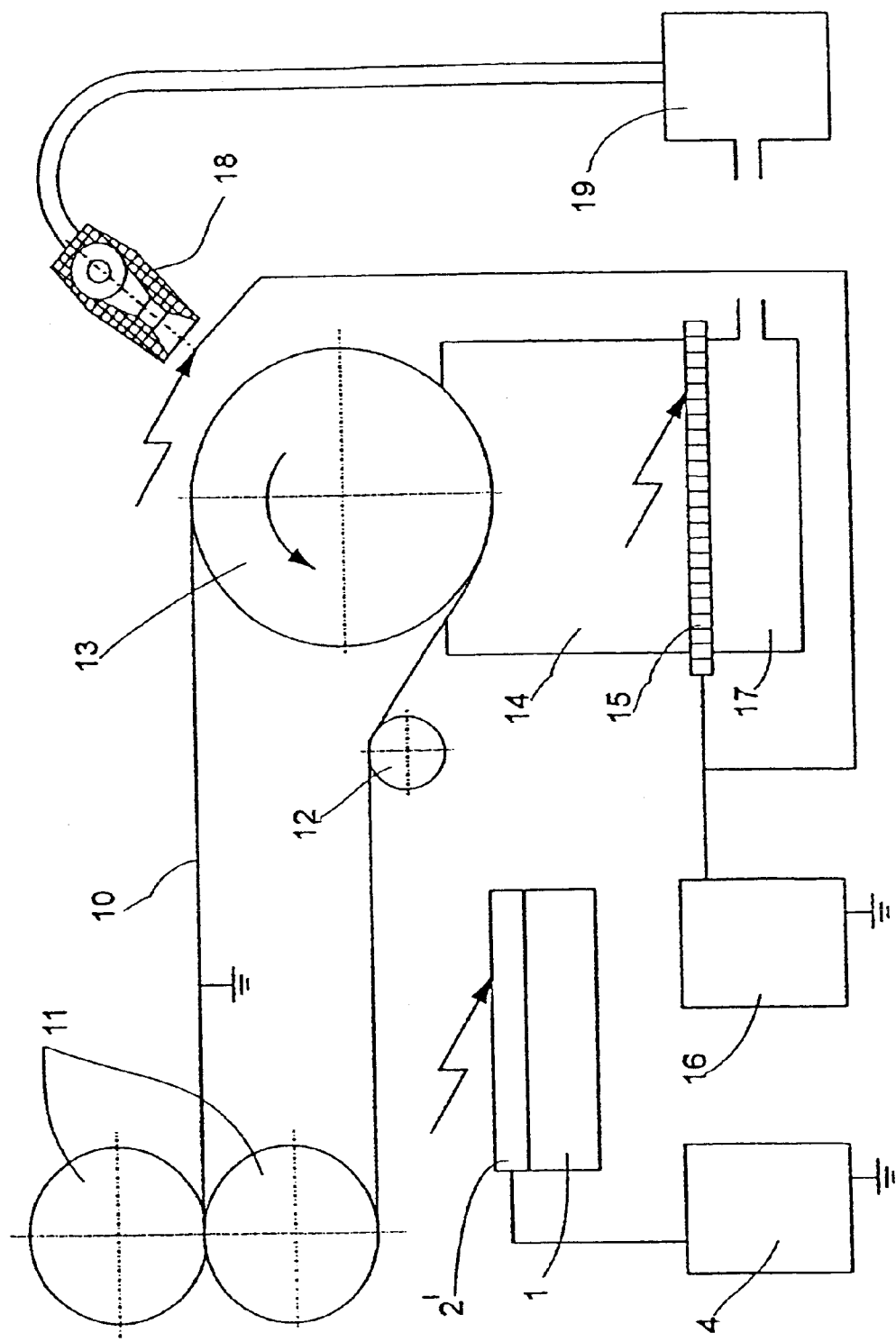
FIG. 1 is a schematic diagram of a device of the present invention, including two alternative electrified aerosol generators.

The present invention is of a high efficiency particulate air filter, which is also referred to herein as unwoven polymer structure and further of a device and process for the electrostatic precipitation of fibers thereof. Specifically, the present invention can be used to make a composite unwoven filter.

The principles and operation of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to the present invention there is provided high efficiency particulate air filter comprising unwoven fibers of a polymer. The filter according to the present invention is capable of filtering out at least 99.97% of 0.3 μm particulates in air flowing at 5 cm/sec and has a pressure drop of 13 mm H$_2$O, preferably of about 10 mm H$_2$O, more preferably of about 5 mm H$_2$O, most preferably of about 2 mm H$_2$O, optimally of about 0.75 mm H$_2$O, or less. Thus a pressure drop of any value in a range of about 0.75 mm H$_2$O and about 13 mm H$_2$O is within the scope of the present invention.

The filter according to the present invention preferably has a dust load to filter weight per area ratio of about 1 to about 1.8. Any value within this range is within the scope of the present invention. For example, a filter according to the present invention weighting 100 grams/m$^2$ and having a 1.5 dust load to filter weight per area ratio suffers a two fold increase in its pressure drop when loaded with 150 grams/m$^2$ of dust.

It will be appreciated that the filters disclosed in U.S. Pat. Nos. 4,874,659 and 4,178,157 described in the Background section above are characterized by a dust load to filter weight per area ratio of less than 0.8.

According to a preferred embodiment of the present invention the filter is substantially electrically neutral and therefore its characteristics as a filter are much less affected by air humidity as compared with the filters disclosed in U.S. Pat. Nos. 4,874,659 and 4,178,157, described in the Background section above, which owe their performances to the charges associated therewith. The filter of the present invention becomes electrically neutral typically within 5–10 minutes after its precipitation on a precipitation electrode, as further described hereinunder.

According to another preferred embodiment of the present invention the fibers have a diameter of about 0.1 μm to about 20 μm. Fibers having a diameter of about 0.1–0.5 μm, about 0.5–2 μm, about 2–5 μm and about 5–20 μm, are all within the scope of the present invention, and are obtainable by selecting appropriate process parameters as further detailed hereinunder. It will be appreciated that the filters disclosed in U.S. Pat. Nos. 4,874,659 and 4,178,157, described in the Background section above are characterized by diameters in a range more than 10 to about 200 μm.

According to yet another preferred embodiment of the present invention, at least about 90% of the fibers have a diameter in a range of X and 2X, where X is any value in a range of about 0.1 μm and about 10 μm. According to still another preferred embodiment of the present invention, the filter featuring pores formed among the fibers, wherein at least about 90% of the pores have a diameter in a range of Y and 2Y, where Y is any value in a range of about 0.2 $\mu$m and about 10 $\mu$m. These latter features of the filter according to the present invention are effected by the preferred method of its manufacture, as further detailed hereinunder. The filters disclosed in described in the Background section above fail to enjoy the described homogeneity in fiber and pore diameters.

Figure 7:
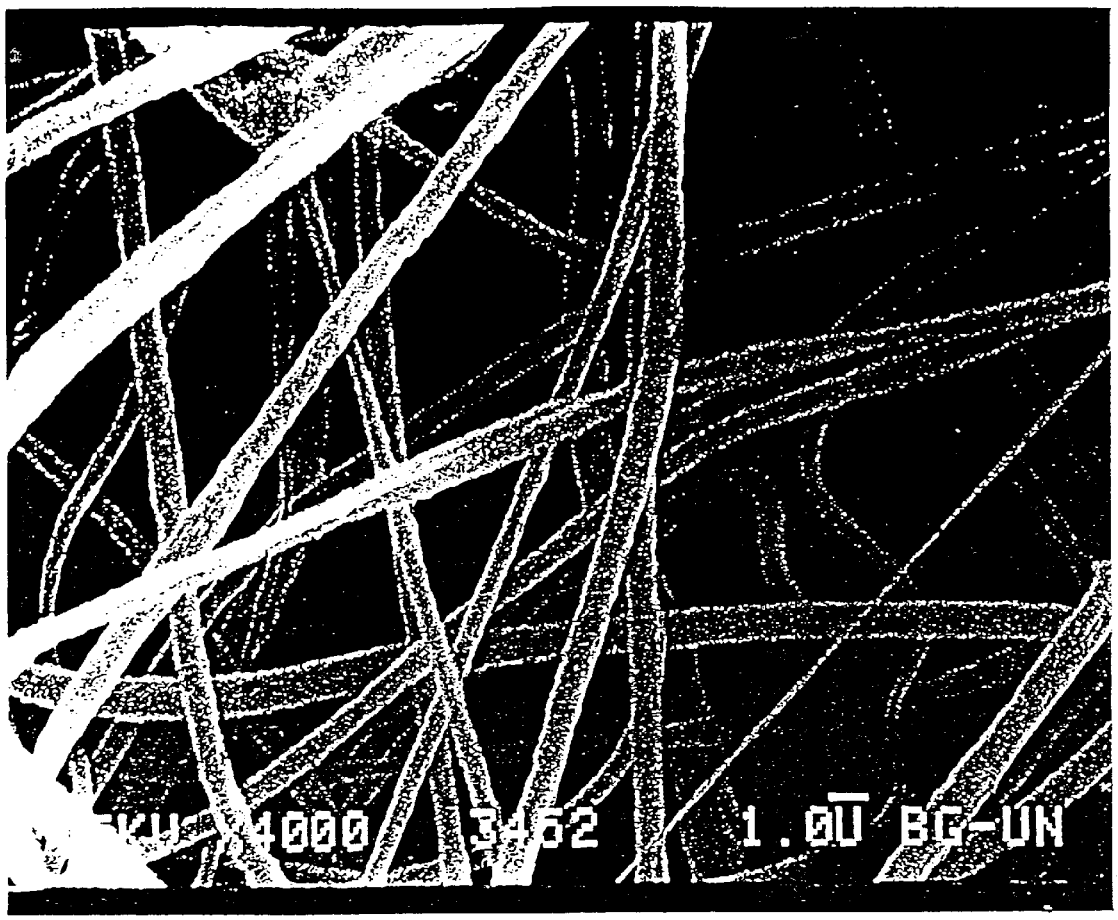
FIG. 7 is an electron micrograph of a filter according to the present invention.

FIG. 7 provides a 4000 fold magnification of the filter described herein. Please note that many of the fibers shown have a 1 $\mu$m thickness (equals to 4 mm in the electron micrograph) and that the deviation is low. Such magnifications were employed to extract the above listed features and ranges describing the physical properties of the filter according to the present invention, and which distinct the filter according to the present invention from prior art filters.

According to a preferred embodiment of the present invention the filter is further supplemented with a filler, which, as described hereinabove and further detailed hereinunder, is useful in the removal of mercaptans, as substrate for catalytic reactions, in the enhancement of the bactericidal effect of the filtering material, etc.

The technological process of preparation of the composite filtering material according to the present invention includes two basic stages, which take place simultaneously. The first consists of the formation and precipitation on a constantly moving surface (base) of ultra-thin fibers (typically in a range of 0.1–10 $\mu$m) from the polymer solution that flows out of the capillary apertures under the action of an electric field.

The second operation is the introduction of micro-dispersed particles of filler of a particular composition into the fiber structure (matrix) formed previously in the first stage of production.

A basic variant of the device of the present invention (FIG. 1) includes a high-voltage electrode-collector 1, manufactured as a bath, filled with the polymer solution (or melted polymer) and provided with a base 2 and a cover 2'. The electrode-collector is connected to a feeder 3 (shown in FIG. 2b) by a flexible pipe, installed so as to allow vertical movement, and a source 4 of high voltage of negative polarity.

Figure 2A:
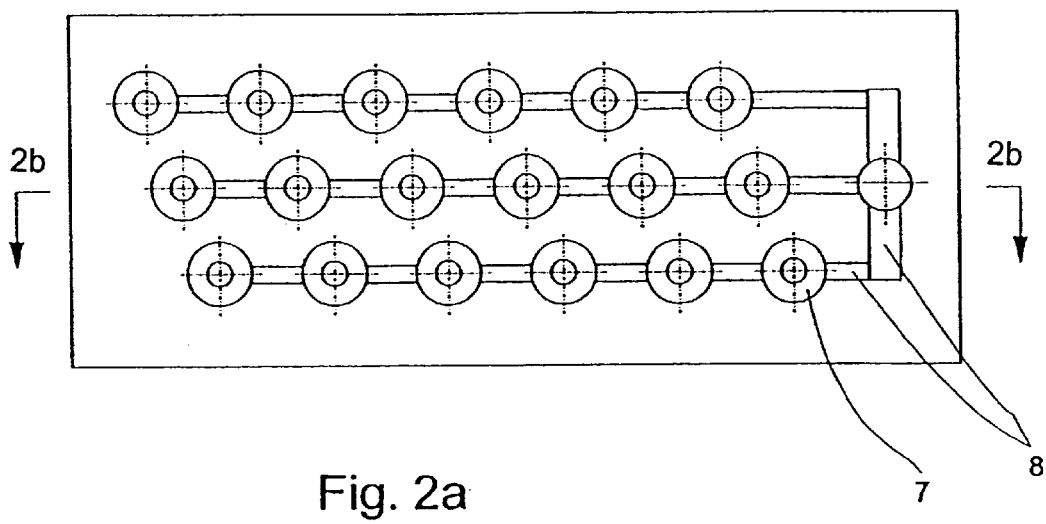
FIG. 2a is a top view of the electrode-collector of the device of FIG. 1.

Spinnerets 5 with nozzles 6 having capillary apertures are screwed into threaded openings formed in cover 2' of the electrode-collector as on a chess board (FIG. 2). Because the height of the spinnerets is slightly less than the width of cover 2' and the length of each nozzle 6 exceeds the width of cover 2', the nozzle section is placed above cover 2' on the axis of cylindrical depressions 7, connected to each other by a system of open channels 8 (FIG. 2a). The solvent is fed into this system of channels from a vessel 9

A precipitation electrode 10 is situated at a certain distance (e.g., about 15–50 cm) above cover 2'. Precipitation electrode 10 is manufactured in the form of a constantly moving surface (when in the operating mode), for example, a belt made of electrical conducting material. Precipitation electrode 10 is grounded. Shafts 11 and 12, connected to an electrical motor (not depicted on drawings), are responsible for driving precipitation electrode 10, keeping precipitation electrode 10 under tension, and preliminary compression of the material on precipitation electrode 10.

A part of precipitation electrode 10 is wound around shaft 13, which has a large diameter, and is thus immersed in the rectangular cavity of the electrified aerosol generator. The cavity of the electrified aerosol generator is divided into two sections by a porous conducting partition 15. The latter is connected to a high-voltage source 16 of positive polarity. The lower part 14 of the electrified aerosol generator, forming pressure chamber 17, is connected to a compressor (not shown on drawings). A micro-dispersible filler is poured onto the surface of the porous partition 15 in the upper part of the generator. The entire device depicted in FIG. 1 is preferably contained in a hermetically sealed container, provided with a suction unit and a settling chamber for trapping and re-circulation of the solvent vapors (not shown on drawings).

The electrified aerosol generator may also be implemented in the form of a slot sprayer 18, connected by a pipe to a dry powder ejection feeder 19 and a source of positive high voltage 16. The use of the slot sprayer with a charging of aerosol in the field of the corona discharge is preferred in the case of metallic powders (including graphite powder) and powders that are not easily fluidized.

It was experimentally found that in filters with high pleatability performances are achievable by adding to the basic layer of polymer a minute quantity (say about 2–3%) of a powder, such as polypropylene powder, epoxy powder and/or phenolformaldehyde powder, and further adding about 5–6% of a second powder such as talc powder, zinc powder and/or titanium oxide powder and thereafter heating the powders loaded filter to about 70–80% of the melting temperature of the polymer employed in the basic layer.

The heating rate of any of the above powders depends on the powder's dispersion and specific heat characteristics. So, for polymer powders with high dispersion (root mean square diameter of 1–5 $\mu$m) heating is low. Coarser metallic and oxide powders require relatively higher temperatures.

Figure 3:
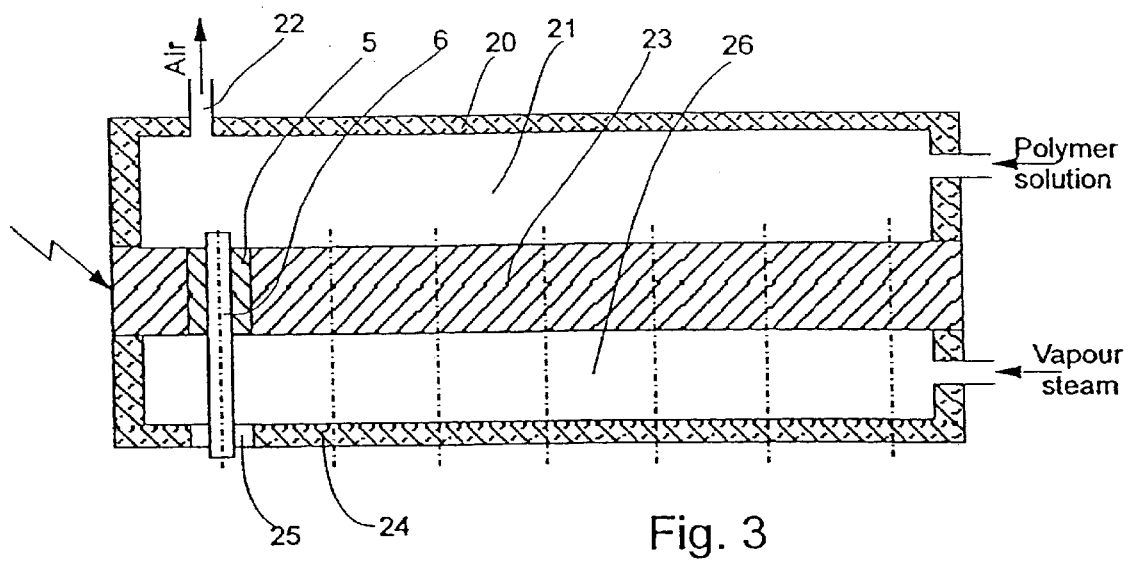
FIGS. 3 and 4 are lateral cross sections of alternative nozzle-based electrode-collectors.

The direction of fiber feeding on the vertical surface may be reversed, and the dimensions of the electrode-collector and the number of capillaries may be minimized with the help of the device depicted in FIG. 3. The device consists of an electrode-collector frame 20, manufactured from a dielectric material and having a central channel 21, for example, of cylindrical shape. This channel is connected by a pipe to a feeder (not shown on the drawing) and is provided with aperture 22 to facilitate exchange of gases with the atmosphere. A busbar 23 with spinnerets 5 and nozzles having capillary apertures is installed in the lower part of frame 20. The nozzles are connected to a source of high voltage (not shown on the drawing). Cover 24 with apertures 25 is placed before the busbar. Nozzles 6 are placed in these apertures with coaxial clearance. The internal surface of the cover and busbar form a cavity 26, which is connected to a saturator (not shown on drawing) by a pipe.

Figure 4:
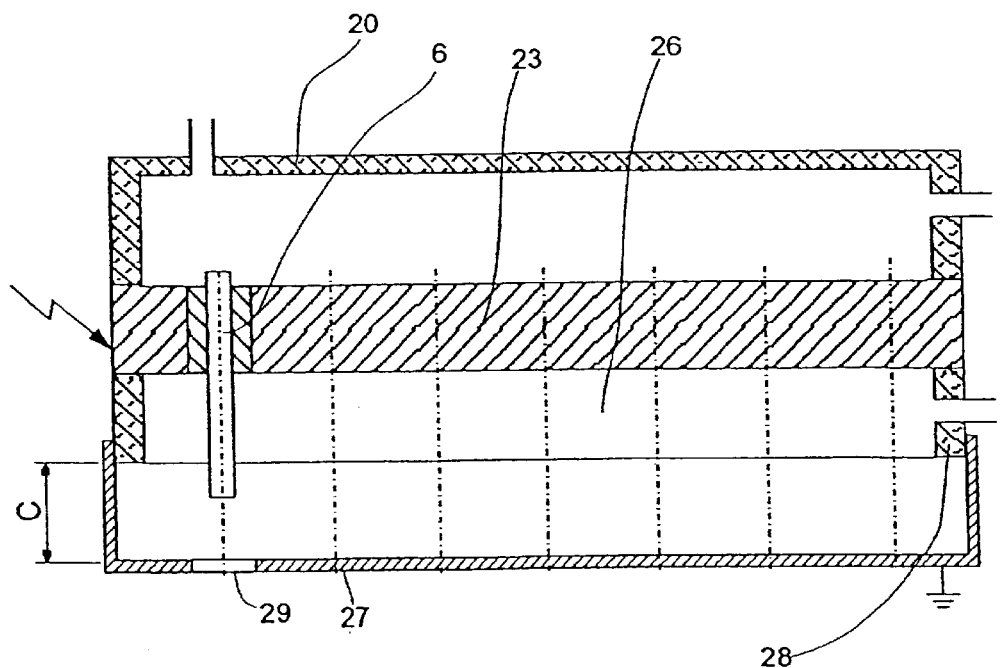

In a number of cases, the process of manufacturing the composite filtering material may be improved by implementation of the device shown in FIG. 4. Here, a dielectric flange 28 serves as a base for a perforated grounded plate 27 (or alternatively an under potential plate, of the same polarity of the high voltage electrode, but with lower voltage), which is installed, with a certain clearance C, say about 0.5–3 cm, parallel to the surfaces of the electrode-collector 20 and the busbar 23. Plate 27 rests on the flange in such a way as to provide for vertical movement for regulation of the size of the clearance C. Apertures 29 of the perforated plate are co-axial to the apertures of electrode-collector's nozzles. The internal surface of perforated plate 27 and busbar 23 form a cavity 26, which is connected by a pipe to a saturator.

The proposed device in its basic form functions as follows: From feeder 3 (FIG. 2b), the polymer solution runs into electrode-collector bath 1, and under the action of hydrostatic pressure the polymer solution begins to be extruded through the capillary apertures of nozzles 6. As soon as a meniscus forms in the polymer solution, the process of solvent evaporation starts. This process is accompanied by the creation of capsules with a semi-rigid envelope, the dimensions of which are determined, on the one hand, by hydrostatic pressure, the concentration of the original solution and the value of the surface tension, and, on the other hand, by the concentration of the solvent vapor in the area of the capillary apertures. The latter parameter is optimized by choice of the area of free evaporation from cover 2' and of the solvent temperature. Alternatively or additionally it is optimized by covering the device and supplementing its atmosphere with solvent vapor (e.g., via a solvent vapor generator).

An electric field, accompanied by a unipolar corona discharge in the area of nozzle 6, is generated between cover 2' and precipitation electrode 10 by switching on high-voltage source 4. Because the polymer solution possesses a certain electric conductivity, the above-described capsules become charged. Coulombic forces of repulsion within the capsules lead to a drastic increase in hydrostatic pressure. The semi-rigid envelopes are stretched, and a number of point microruptures (from 2 to 10) are formed on the surface of each envelope. Ultra-thin jets of polymer solution start to spray out through these apertures. Moving with high velocity in the inter-electrode interval, these jets start to lose solvent and form fibers that are chaotically precipitated on the surface of the moving precipitation electrode 10, forming a sheet-like fiber matrix. Since the polymer fiber posses high surface electric resistance and the volume of material in physical contact with precipitation electrode surface is small, the fiber matrix preserves the negative electric charge for a long time, about 5–10 minutes. It will be appreciated that the electrical resistnce can be regulated by special additives.

When compressed air is fed into pressure chamber 17 of electrified aerosol generator 14 and high-voltage source 16 is switched on, the micro-dispersible filler becomes fluidized and acquires a positive electric charge. Under the action of electric and aerodynamic forces, the filler particles move to the surface of precipitation electrode 10, which holds the fiber matrix. As a result of the action of Coulombic forces, the filler particles interact with the fiber matrix, penetrate its structure, and form a composite material.

When the belt of precipitation electrode 10 passes between shafts 11, preliminary material compression takes place, accompanied by re-distribution of the filler particles in the matrix volume. Spherical particles, attached to the fiber material solely by electrical forces, move along paths of least resistance into micro-zones having a minimum volume density of matrix material, filling large pores, and thus improving the homogeneity of the composite and the degree of micro-dispersity of the pores.

The micro-dispersible powders from the following materials may be used as fillers: a polymer of the same chemical composition as that in the matrix, polymer latexes, glass, or Teflon, as well as active fillers that lead to the production of composite microfiltering materials with new consumer properties. These new materials may find application as adsorbents, indicators, catalysts, ion-exchange resins, pigments bactericides, etc.

The use of an electrified aerosol generator, as described above with the fluidized layer, facilitates high productivity of the process and product homogeneity. However, several powders have difficulty in forming a fluidized layer: metallic powders, particularly catalytic metals, can be subjected to electric precipitation only in the field of a unipolar corona discharge. Therefore, in these cases, as well as in the case in which it is necessary to measure out exact amounts of filler, it is worthwhile to use a slot sprayer 18 as the electrified aerosol generator (FIG. 1).

When compressed air from a compressor is fed into the dry powder feeder and the high voltage source is switched on, the powdered filler is ejected into slot sprayer 18. The aerosol cloud coming out of the sprayer apertures becomes charged in the unipolar corona discharge field, and under the action of electric and aerodynamic forces is transferred to the precipitation electrode, where it interacts with the fiber matrix as described above.

The functioning of the device described in FIG. 3 corresponds, in the main aspects, with the operation of the basic device. The main difference is as follows: solvent vapor from the saturator under slight excess pressure is fed into cavity 26 and exits via aperture 25, flowing over the edges of the apertures of nozzles 6. Alternatively or additionally the device is covered and its atmosphere supplemented with solvent vapor (e.g., via a solvent vapor generator).

The advantage of this configuration lies in the facts that it provides the possibility of easy spatial re-orientation and fiber feeding in any direction and that it can be manufactured in compact form with a small number of capillaries. A device of this type is not efficient in installations aimed at high throughput due to difficulties in obtaining homogenous distribution of the vapor-air mixture through a large number of apertures and to the possibility of vapor condensation in pipes and subsequent falling of drops.

Intensification of the fiber matrix manufacturing process and a reduction of fiber width in order to produce filtering materials with a minimum pore size assumes, on the one hand, that the intensity of the electric field should be increased to values close to the level at which electrical discharges would begin to form between the emerging fibers and precipitation electrode 10 and, on the other hand, that the concentration of solvent vapors in the inter-electrode interval be increased in order to maintain the capability of consolidating fiber formation. Increasing the solvent vapors in the inter-electrode interval can be effected, for example, by covering the device and supplementing its atmosphere with solvent vapor (e.g., via a solvent vapor generator). The optimal electric field strength, both between electrode-collector 1 and precipitation electrode 10, and between the electrified aerosol generator and precipitation electrode 10, is between about 2.5 KV/cm and about 4 KV/cm.

An increase in the average intensity and heterogeneity of the electric field, leading to corona discharge, may be realized by installing, in the inter-electrode interval, one or more grounded electrodes (or alternatively under potential electrodes, of the same polarity of the high voltage electrode, but with lower voltage) manufactured, for instance, in the form of wires. This solution facilitates an increase in the productivity of the process by 1.5–2 times, but it does not lead to formation of short fibers with, varying strength and size parameters. The negative effect of using a linear grounded electrode instead of a planar grounded electrode, thereby producing a non-homogeneous electrical field, may be reduced by increasing the solvent vapor concentration in the fiber-formation area, which is difficult in open devices and increases solvent consumption and in some cases danger of fire. Increasing the solvent vapor concentration in the fiber-formation area can be effected by, for example, covering the device and supplementing its atmosphere with solvent vapor (e.g., via a solvent vapor generator).

This deficiency may be overcome by application of the device described above and depicted in FIG. 4.

Switching on the high-voltage source 4 in the C clearance produces an homogeneous electric field, the intensity of which may be easily increased to 10–15 KV/cm. Under these conditions, the impact of the electric field upon the jet of polymer solution increases significantly. The fiber comes out thinner and more homogeneous along its length. The initial fiber velocity also increases, and thereafter it comes through apertures 29 of perforated plate 27 and is stacked on precipitation electrode surface as described above. A change of the size of clearance C facilitates regulation of fiber thickness and device productivity, as well as the degree of material porosity.

The present invention may be used to produce the polymer fiber structure from a much wider range of polymers than is possible using the prior art of U.S. Pat. No. 2,349,950.

While reducing the present invention into practice, it was found that for obtaining a high efficiency particulate air unwoven fiber structure, capable of filtering out 99.97% of 0.3 $\mu$m particulates in air flowing at 5 cm/sec, and further having the above described features, improved charging of the polymer is required. Improved charging is effected according to the present invention by mixing the liquefied polymer with a charge control agent (e.g., a dipolar additive) to form, for example, a polymer-dipolar additive complex which apparently better interacts with ionized air molecules formed under the influence of the electric field. It is assumed, in a non-limiting fashion, that the extra-charge attributed to the newly formed fibers is responsible for their more homogenous precipitation on the precipitation electrode, wherein a fiber is better attracted to a local maximum, which is a local position most under represented by older precipitated fibers, which, as will be recalled, keep their charge for 5–10 minutes. The charge control agent is typically added in the grams equivalent per liter range, say, in the range of from about 0.01 to about 0.2 normal per liter, depending on the respective molecular weights of the polymer and the charge control agent used.

U.S. Pat. Nos. 5,726,107; 5,554,722; and 5,558,809 teach the use of charge control agents in combination with polycondensation processes in the production of electret fibers, which are fibers characterized in a permanent electric charge, using melt spinning and other processes devoid of the use of an precipitation electrode. A charge control agent is added in such a way that it is incorporated into the melted or partially melted fibers and remains incorporated therein to provide the fibers with electrostatic charge which is not dissipating for prolonged time periods, say months.

In sharp distinction, the charge control agents according to the present invention transiently bind to the outer surface of the fibers and therefore the charge dissipates shortly thereafter (within minutes). This is because polycondensation is not exercised at all such that chemical intereaction between the agent and the polymer is absent, and further due to the low concentration of charge control agent employed. The resulting filter is therefore substantially charge free.

Thus, a mechanism for charging the liquefied polymer to a first electrical potential relative to the precipitation electrode according to the present invention preferably includes a source of high voltage, as described above, and a charge control agent mixed with the liquefied polymer.

Suitable charge control agents include, but are not limited to, mono- and poly-cyclic radicals that can bind to the polymer molecule via, for example, —C=C—, =C—SH— or —CO—NH— groups, including biscationic amides, phenol and uryl sulfide derivatives, metal complex compounds, triphenylmethanes, dimethylmidazole and ethoxytrimethylsians. Conductivity control additives as further described below may also be employed.

The functionality of biscationic amides, for example, was experimentally evaluated. To this end, a 14% solution of a branched polycarbonate polymer (MW=ca. 110,000) in chloroform was prepared (viscosity was 180 cP). The above solution, supplemented with increasing concentration of bicationic acid amide was used in combination with a device as depicted in, and as described with relation to, FIG. 3 to precipitate filters, which were thereafter inspected for physical and functional properties. The examination included estimation of fiber diameter and uniformity of distribution, as well as, pressure drop evaluations. The addition of increasing amounts of bicationic acid amide did not alter fiber diameter, however, it had a striking effect on uniformity of distribution which resulted in lowering the pressure drop values associated with such filters, as exemplified in Table 1, below:

TABLE 1

| Concentration of bicationic acid amide (N · $10^{-2}$) | Pressure drop for 100 g/m$^2$ filters (mm H$_2$O) |
| --- | --- |
| 0 | 22 |
| 0.1 | 22 |
| 0.2 | 18 |
| 0.3 | 6 |
| 0.5 | 5 |
| 0.6 | 5 |
| 0.7 | 6 |
| 1.0 | 5 |

It is evident from Table 1 that the added charge control agent improves the filter product in terms of pressure drop. It is further clear that the influence of the charge control agent reaches its maximal effectiveness in a low concentration and that increasing its concentration above that value fails to further improve the quality of the product in terms of pressure drop.

In a similar experiment, the functionality of metal complex compound (iron salicylic acid complex), for example, was experimentally evaluated. To this end, a 12% solution of a polysulfone polymer (MW=ca. 80,000) in chloroform was prepared (viscosity was 140 cP, conductivity was 0.32 $\mu$S). The above solution, supplemented with increasing concentration of the metal complex compound was used in combination with a device as depicted in, and as described with relation to, FIG. 3 to precipitate filters, which were thereafter inspected for physical and functional properties. The examination included estimation of fiber diameter and uniformity of distribution, as well as, pressure drop evaluations. As before, the addition of increasing amounts of the charge control agent did not alter fiber diameter, however, it had a striking effect on uniformity of distribution which resulted in lowering the pressure drop values associated with such filters, as exemplified in Table 2, below:

TABLE 2

| Concentration of iron salicylic acid complex (N · $10^{-2}$) | Pressure drop for 100 g/m$^2$ filters (mm H$_2$O) |
| --- | --- |
| 0 | 18 |
| 0.1 | 9 |

TABLE 2-continued

| Concentration of iron salicylic acid complex (N · 10⁻²) | Pressure drop for 100 g/m² filters (mm H₂O) |
|---|---|
| 0.2 | 3 |
| 0.3 | 3 |
| 0.5 | 3 |
| 0.6 | 3 |
| 0.7 | 3 |
| 1.0 | 3 |

It is evident from Table 2 that the added charge control agent improves the filter product in terms of pressure drop. It is further clear that the influence of the charge control agent reaches its maximal effectiveness in a low concentration and that increasing its concentration above that value fails to further improve the quality of the product in terms of pressure drop.

This phenomenon can be explained by saturation of the polymer fiber surface by the charge control agent and further by loss of access charge to the surrounding atmosphere.

The charge (or its absence) can be measured by a dedicated device namely a gauge for measuring electric field intensities. The end value of the electric charge or rate of loss does not reflect on homogenous fiber distribution. Only the initial rate of the charge is important to this end. The time required for charge dissipation is about few minutes.

The device and method according to the present invention differ from those disclosed in U.S. Pat. Nos. 4,043,331 and 4,127,706 to Martin et al. and U.S. Pat. No. 1,975,504 to Anton Formhals in that it enables manufacturing a high efficiency particulate air unwoven fiber structure, capable of filtering out 99.97% of 0.3 μm particulates in air flowing at 5 cm/sec and which further enjoy the physical features described hereinabove.

The devices and methods disclosed in the above patents are only capable of providing lower grade filters which fail to meet the requirements of high efficiency particulate air filters as described herein.

According to a preferred embodiment of the present invention, charging the liquefied polymer to a first electrical potential relative to the precipitation electrode is followed by recharging the liquefied polymer to a second electrical potential relative to the precipitation electrode, the second electrical potential is similar in magnitude, yet opposite in sign with respect to first electrical potential. Preferably the charge is oscillated between the first and second electrical potentials in a frequency of about 0.1–10 Hz, preferably about 1 Hz. The charge oscillation results in process productivity, more homogeneous distribution of precipitated fibers and yielding filters with improved qualities as described hereinabove.

Polymers amenable to the present invention include polysulfone, polyphenyl sulfone, polyether sulfone, polycarbonate in general, ABS, polystyrene, polyvynilidene fluoride, postchlorinated polyvinyl chloride and polyacrilonitrile. Suitable solvents include, inter alia, chloroform, benzene, acetone and dimethylformamide. The optimal concentration of the solution depends on the specific polymer and solvent used. Generally, the higher the concentration of polymer in the solution, the higher the process yield and the lower the product porosity. Concentrations of between about 10% and about 12% have been found optimal for the polymer solution used in electrode-collector 1. Melted polymers such as, but not limited to, polyolefins, including polyethylene and polypropylene, are also amenable to the process according to the present invention.

It has been found advantageous to add certain additives to the solutions of these polymers. Amine salts such as tetraethyl ammonium bromide and benzyltriethylammonium bromide, are used to regulate the conductivity of the polymer solution, as described above. Small amounts of high molecular weight (order of 500,000) polyoxyalkylene additives, such as polyethylene glycol and polyvinyl pyrrolidone promote the formation of the polymer solution jets by reducing intermolecular friction. Surfactants such as dimethylmidazole and ethoxytrimethylsilane enhance fiber thickness and uniformity. Using additives reducing viscosity and surface tension it is possible to increase the polymer concentration up to about 17–18%.

More generally, the scope of the present invention includes the manufacture of the polymer fiber structure from a liquefied polymer, and not just from a polymer solution. By a liquefied polymer is meant a polymer put into a liquid state by any means, including dissolving the polymer in a solvent, as described above, and melting the polymer.

Also more generally, the scope of the present invention includes the formation of a surface on the liquefied polymer, of sufficient curvature to initiate the process discussed above of the charged capsules, leading to the formation of the jets of liquefied polymer that turn into fibers and precipitate onto precipitation electrode 10. As discussed above, if the liquefied polymer is a polymer solution, the fibers are formed by evaporation of the solvent. If the liquefied polymer is a melt, the fibers are formed by solidification of the jets.

Figure 5:
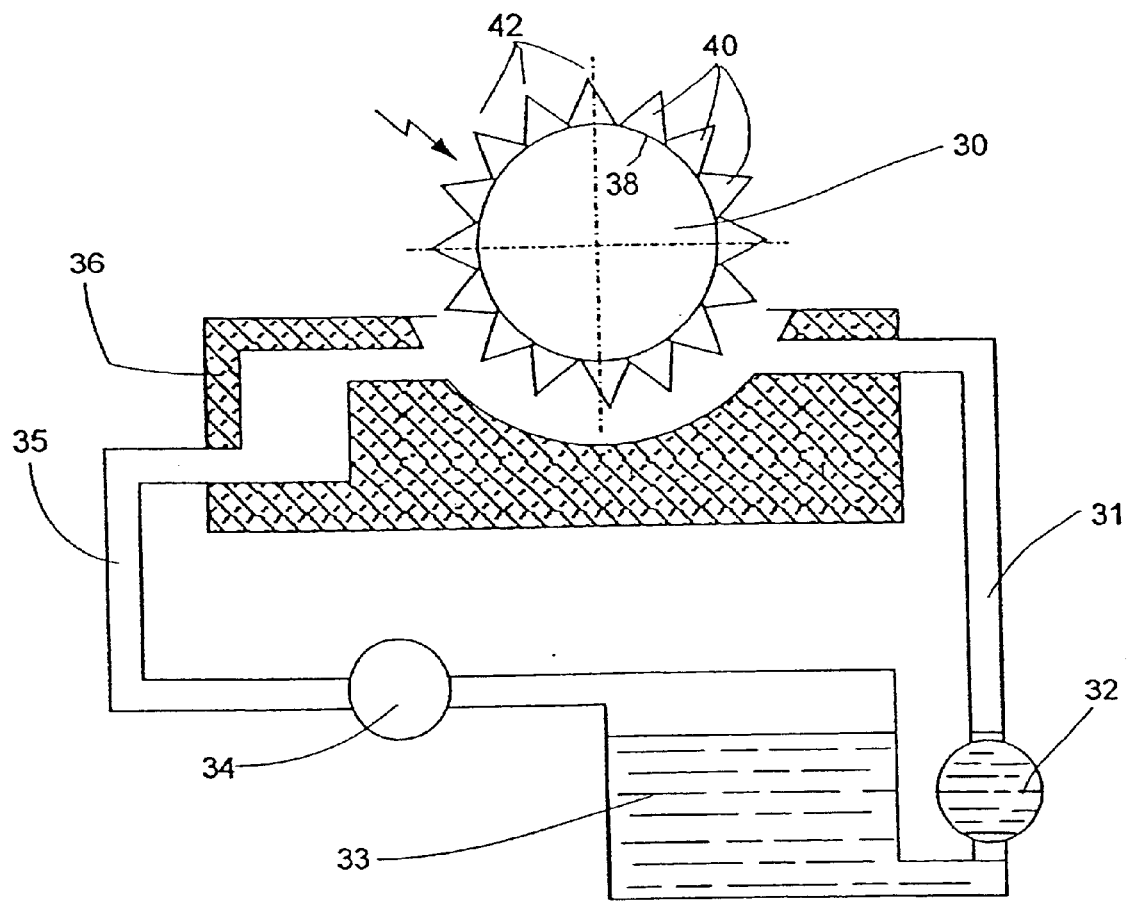
FIG. 5 is a lateral cross section of an electrode-collector based on a rotating wheel.
Figure 6:
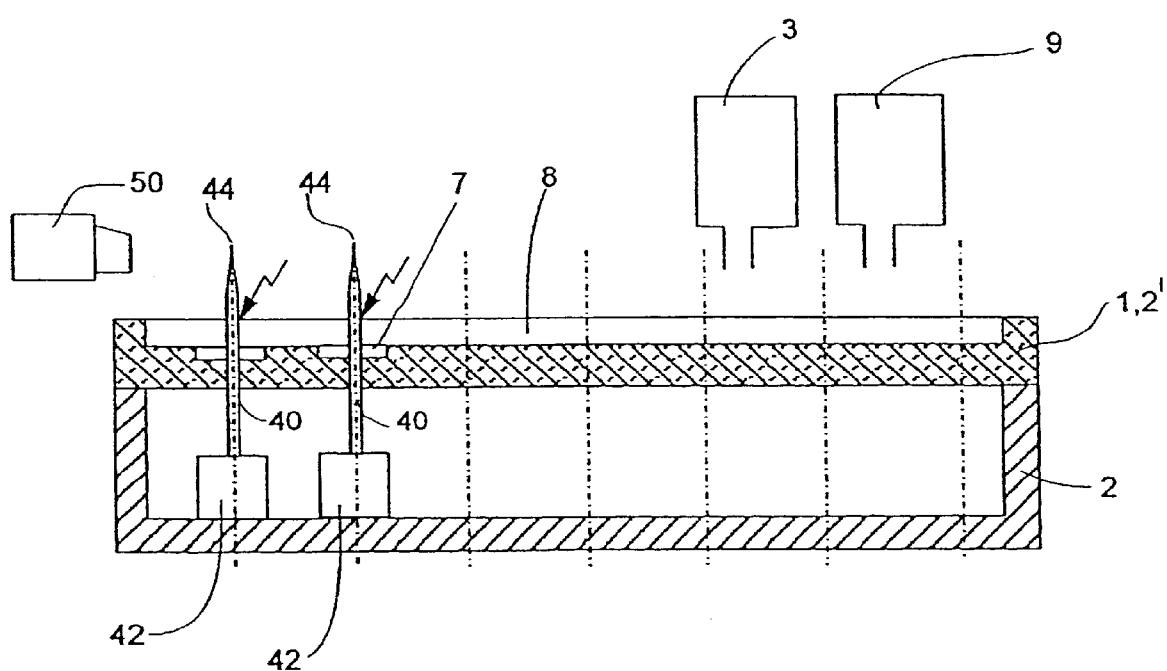
FIG. 6 is a lateral cross section of: an electrode-collector based on reciprocating needles.

In the process of the present invention as described above, the highly curved surfaces are the menisci of polymer solution emerging from nozzles 6. Other mechanisms for forming these highly curved surfaces are illustrated in FIGS. 5 and 6. FIG. 5 illustrates a variant of electrode-collector 1 in which the polymer solution, stored in a tank 33, is pumped by a pump 32 through a feed pipe 31 to a delivery chamber 36. Rotateably mounted in delivery chamber 36 is a circular wheel 30 made of an electrically conductive material. Mounted on rim 38 of wheel 30 are triangular protrusions 40 made of a material that is wetted by the polymer solution. Tips 42 of protrusions 40 point radially outward from wheel 30. Wheel 30 is charged negatively by source 4. As the polymer solution is delivered to chamber 36, wheel 30 rotates and each of protrusions 40 is successively coated with a layer of the polymer solution, which in turn acquires a negative charge. The surface of the portion of this polymer solution layer that surrounds tip 42 constitutes the highly curved surface whence the charged jets emerge. Polymer solution not consumed in the course of precipitating fibers onto precipitation electrode 10 is returned to tank 33 via an outlet pipe 35 by a pump 34. The optimal concentration of polymer solution used in this variant of electrode-collector 1 generally has been between about 14% and about 17%.

Figure 2B:
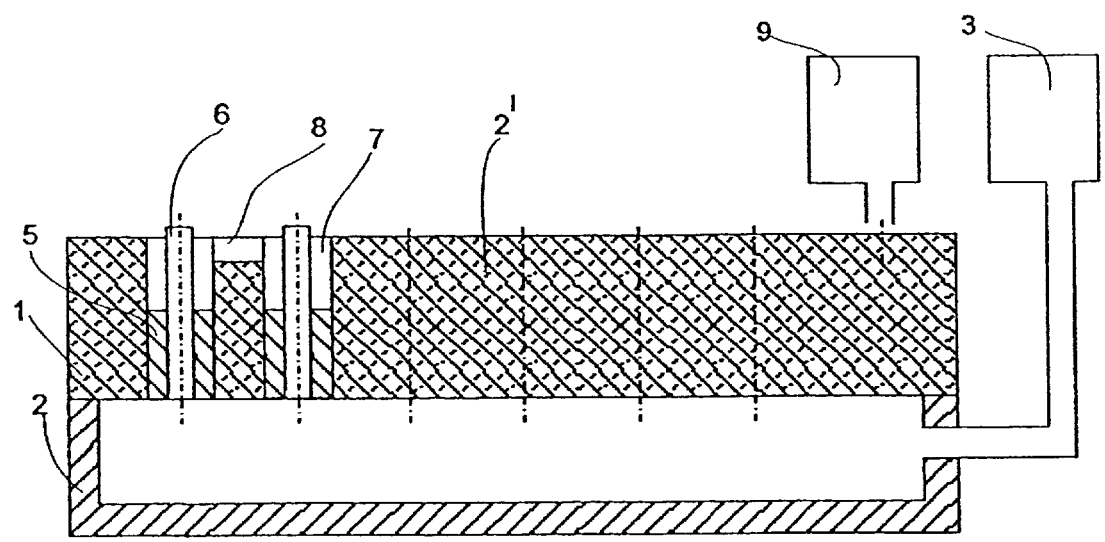

FIG. 6 is a partial illustration, in cross-section, similar to the cross-section of FIG. 2b, of a variant of electrode-collector 1 in which nozzles 6 are replaced by reciprocating needles 40, made of an electrically conductive material that is wetted by the polymer solution. Each needle 40 is provided with a mechanism 42 for raising and lowering needle 40. When a needle 40 is lowered, the sharpened tip 44 thereof is wetted and coated by the polymer is solution. The surface of the polymer solution is highly curved at tip 44. When a needle 40 is raised towards precipitation electrode 10, the high voltage difference between needle 40 and precipitation electrode 10 causes jets of the polymer solution to emerge from the polymer solution surrounding tip 44 and to stream towards precipitation electrode 10. It should be noted that in this variant of electrode-collector 1, only needles 40, and hence the polymer solution thereon, are negatively charged by source 4.

Also shown in FIG. 6 is a speaker 50 of a system for producing acoustical vibrations in the air above electrode-collector 1. Speaker 50 emits a tone of a single frequency, preferably in the range between about 5000 Hz and about 30,000 Hz, towards needles 40. The vibrations thus induced in the highly curved surfaces of the polymer solution on tips 44 have been found to stimulate the emission of jets of polymer solution towards precipitation collector 10.

FIGS. 8–15 teach additional preferred embodiments of the device and method according to the present invention.

Figure 8:
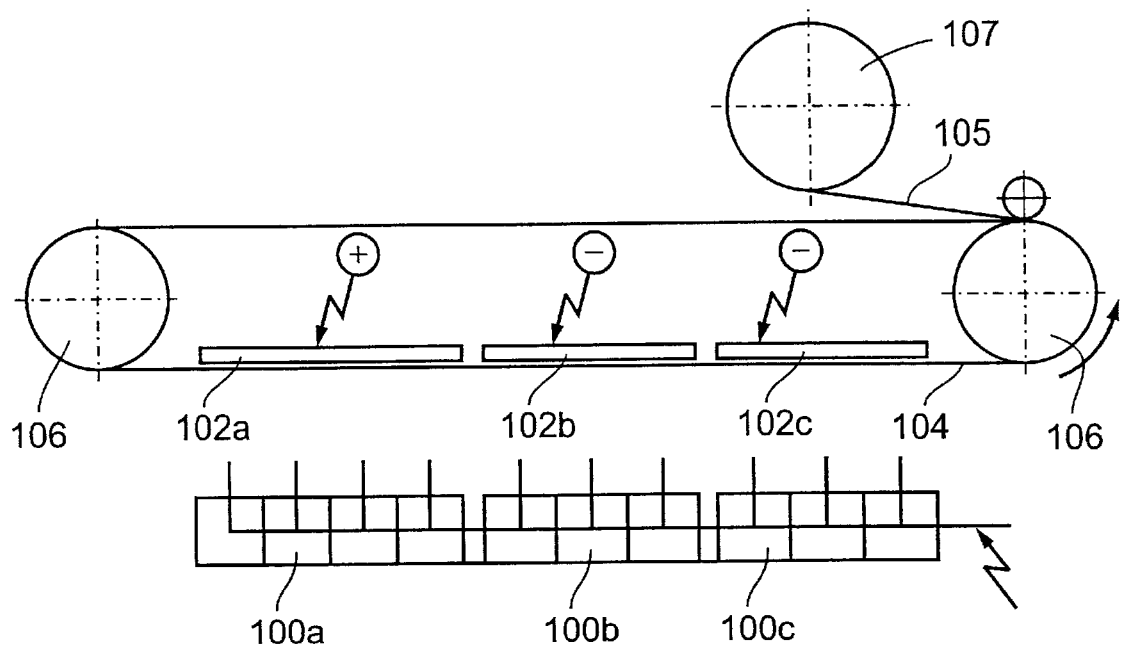
FIG. 8 is a cross section of a preferred embodiment of the device according to the present invention, adapted for manufacturing a layered filter having a support layer and a prefilter layer surrounding a middle layer of high efficiency particulate air filter.

Thus, as shown in FIG. 8, for the formation of a multi-layered filter having a prefilter layer and a support layer surrounding a middle layer of high efficiency particulate air filter, a triple configuration of the device described above, with some modifications described hereinunder is provided. Thus, electrode-collector 1 is replaced according to this configuration by three electrode-collectors 100*a*, 100*b* and 100*c*, each designed for precipitation of one of the above layers of the layered filter. Via a suitable source of high voltage, electrode-collectors 100*a*, 100*b* and 100*c* are provided with, for example, a negative potential of, for example, —100 KV. Precipitation electrode 10 according to this embodiment is replaced by a modified version having three independent precipitation electrodes 102*a*, 102*b* and 102*c* and a revolving belt 104, wound around revolving shafts 106. The location of precipitation electrodes 102*a*, 102*b* and 102*c* is selected above electrode-collectors 100*a*, 100*b* and 100*c* and via independent sources of high voltage they are provided with positive, negative and negative potentials, say (+1)-(+5), (−1)-(−2) and (−2)-(−5) KV, respectively, generating, for example, 101–105, 98–99 and 95–98 KV potential differences with their respective electrode-collectors 100*a*, 100*b* and 100*c*. These potential differences in combination with the potential drop with distance and with variable polymer solutions are sufficient to induce marked changes upon the precipitated fibers as follows.

In electrode systems such as point-plate with abrupt non-uniform electrical field the intensity drop in the area near the plate electrode is small, so the relative potential can provide sufficient accelerating or decelerating effect.

Thus, fibers resulting from pair 100*a*–102*a* form a pre-filter structure or layer made of relatively refined and coarse (e.g., 8–10 $\mu$m fibers), having a large volume (porosity 0.96), low aerodynamic resistance and high dust loading capacity (40–50% of total mass).

Fibers resulting from pair 100*b* –102*b* form a high efficiency particulate air filter made of fine fibers (e.g. 1–3 $\mu$m in diameter), having lower porosity (e.g., about 0.85–0.88), higher aerodynamic resistance, and a dust loading capacity of about, e.g., 20–30%.

Whereas fibers resulting from pair 100*c*–102*c* form a support film or layer for providing the multilayer filter with mechanical strength and technical properties, such as pleatability, characterized by coarse fibers (10–20 $\mu$m in diameter), porosity of 0.9–0.92 and dust loading capacity of about 20–30%.

In fact, this version of the device according to the present invention combines three individual devices as described herein, each with somewhat modified properties, into a single device enabling the continuous manufacturing of three (or more) layered filter structures, each of the three or more layers featuring different properties and serving a different purpose. Any suitable number, e.g., from 2 to 10, of combined devices in envisaged for different application. In any case, according to this embodiment of the present invention, each of the layers is completely precipitated before turning to the precipitation of another layer, therefore, the properties of the device are selected such that the efficiency of precipitation is as high as required to complete a layer's precipitation in each of the stations in a single round (e.g., by controlling the length of each section or individual device). The resulting filter 105 is rolled over an additional rotating shaft 107.

Figure 9A:
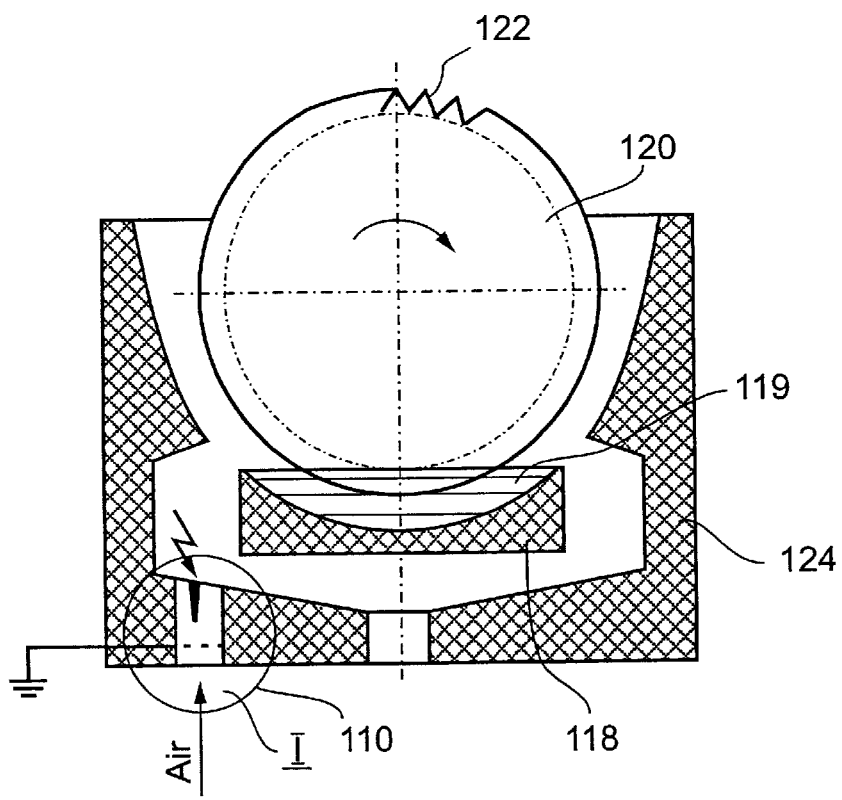
FIG. 9a is a cross section of a preferred embodiment of the device according to the present invention, including an air ionizer to increase the charging of the liquefied polymer and thereby to enable more homogenic precipitation thereof on a precipitation electrode.
Figure 9B:
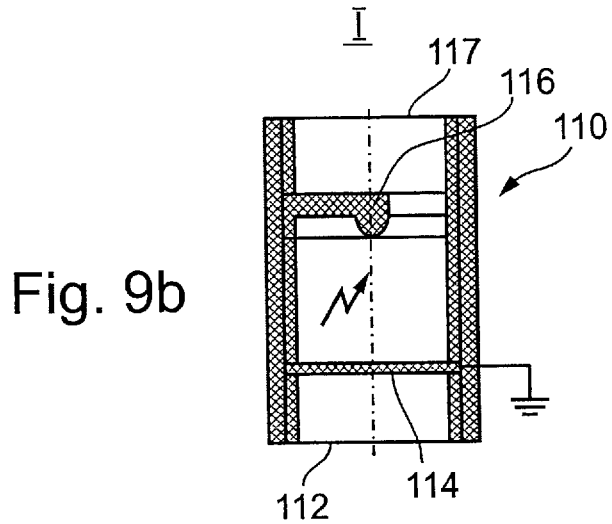
FIG. 9b is an enlarged view of circle I of FIG. 9a, showing an air ionizer in greater detail.

As shown in FIGS. 9*a*–*b*, according to another preferred embodiment of the present invention ionized air generated by an air ionizer 110, including an air inlet 112, a grounded net structure 114, an ionizing electrode 116 generating a potential of e.g., 15 KV/cm, and an air outlet 117, as well known in the art, is used to increase the charging of the liquefied polymer (or fibers) and thereby to enable more homogenic precipitation thereof on a precipitation electrode. To this end, a bath 118, in which the liquefied polymer 119 is held, and from which aliquots thereof are collected via a rotating wheel 120 featuring triangular protrusions 122, as further detailed above with respect to FIG. 5 (wheel 30) is contained in a housing 122 supplemented with ionized air via air ionizer 110. As before, increasing the solvent vapors in the inter-electrode interval can be effected, for example, by covering the device and supplementing its atmosphere with solvent vapor (e.g., via a solvent vapor generator).

Figure 10:
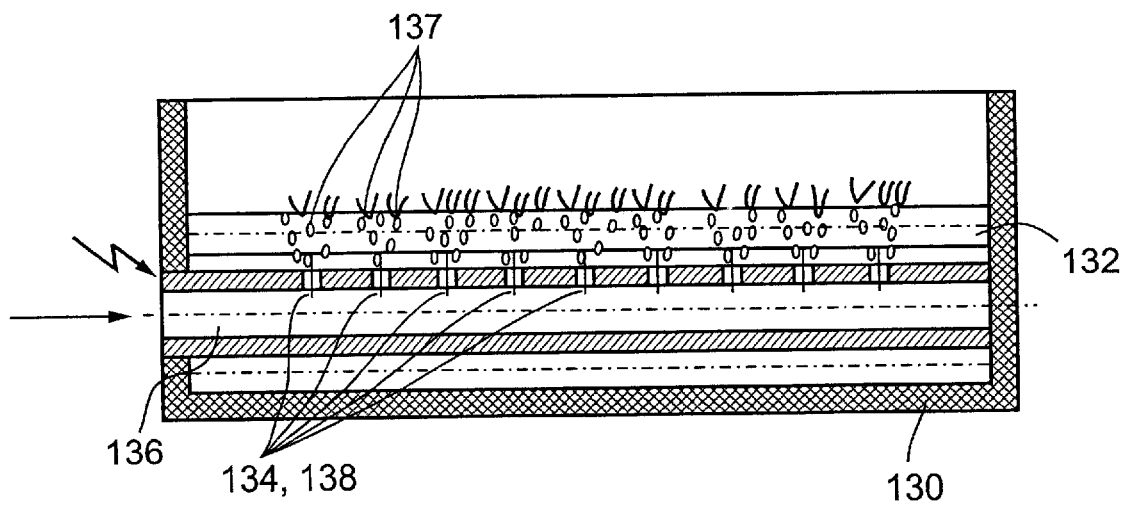
FIG. 10 is a cross section of a mechanism for forming a surface on the liquefied polymer of sufficiently high curvature to cause at least one jet of the liquefied polymer to be drawn to the precipitation electrode effected via generation of bubbles in the liquefied polymer.
Figure 11:
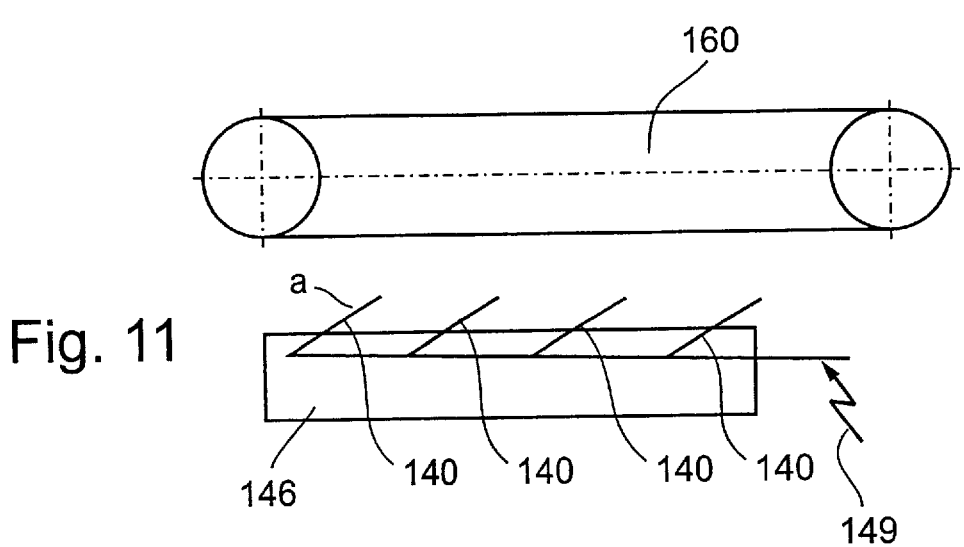
FIG. 11 is a cross section of a device according to the present invention including a plurality of tilted circular wheels.

As shown in FIG. 10, according to another preferred embodiment of the present invention, a mechanism for forming a surface on the liquefied polymer of sufficiently high curvature to cause at least one jet of the liquefied polymer to be drawn by an electrical potential to the precipitation electrode is provided, in which gas (preferably solvent saturated vapor) bubbles formed in the liquefied polymer provide the required surfaces.

To this end, an electrode-collector or bath 130 in which the liquefied polymer 132 (typically but not obligatory a melted polymer in this case) is held is provided with a compressed gas releasing mechanism 134, typically in a form of a pipe 136 supplemented with a plurality of bubbles 137 generating openings 138. When reaching the surface of the liquefied polymer, the bubbles form a surface on the liquefied polymer of sufficiently high curvature to cause at least one jet of the liquefied polymer to be drawn by the electrical potential to the precipitation electrode.

As shown in FIGS. 11 and 12*a*–*b* and 13, according to yet another preferred embodiment of the present invention, rotateably mounted in delivery chamber 146 is a plurality of circular wheels 140. Mounted on rim 148 of wheels 140 are triangular protrusions 150 made of a conductive material that is wetted by the polymer solution. Tips 152 of protrusions 150 point radially outward from wheels 140. Wheels 140 are charged negatively by a source 149. Wheels 140 are provided in a tilted orientation with respect to a precipitation electrode 160, such that as the polymer solution is delivered to chamber 146, wheels 140 rotates and each of protrusions 150 is successively coated with a layer of the polymer solution, which in turn acquires a negative charge, yet, due to the tilted configuration, in general, protrusions 150 which are not dipped in the polymer solution are positioned more evenly apart from electrode 160, as compared with the vertical configuration, shown, for example, in FIG. 5. This, in turn, results in more homogenous fiber precipitation and more homogenous fiber thickness or diameter. In order to avoid electric field superposition effects while implementing this configuration of a plurality of wheels 140, cores 162 of wheels 140 is made of a dielectric substance, whereas outer rims 148 thereof, including protrusions 150, are made of an electric substance. In a somewhat different configuration shown in FIG. 13 the superposition effect is eliminated by selecting an appropriately non shielding wheels tilt arrangement.

As shown in FIG. 14, according to yet another preferred embodiment of the present invention, each of protrusions 150 is formed with a liquefied polymer collecting cavity 151, for facilitating the collection of a measured amount of liquefied polymer. The advantage of this embodiment of the present invention is that it delays the process of fiber formation, such that a protrusion will generate fibers only when about to reenter the liquefied polymer, such that all fibers will be generated from a similar location and distance with respect to the precipitation electrode, thereby improved homogeneity is achievable.

Figure 15:
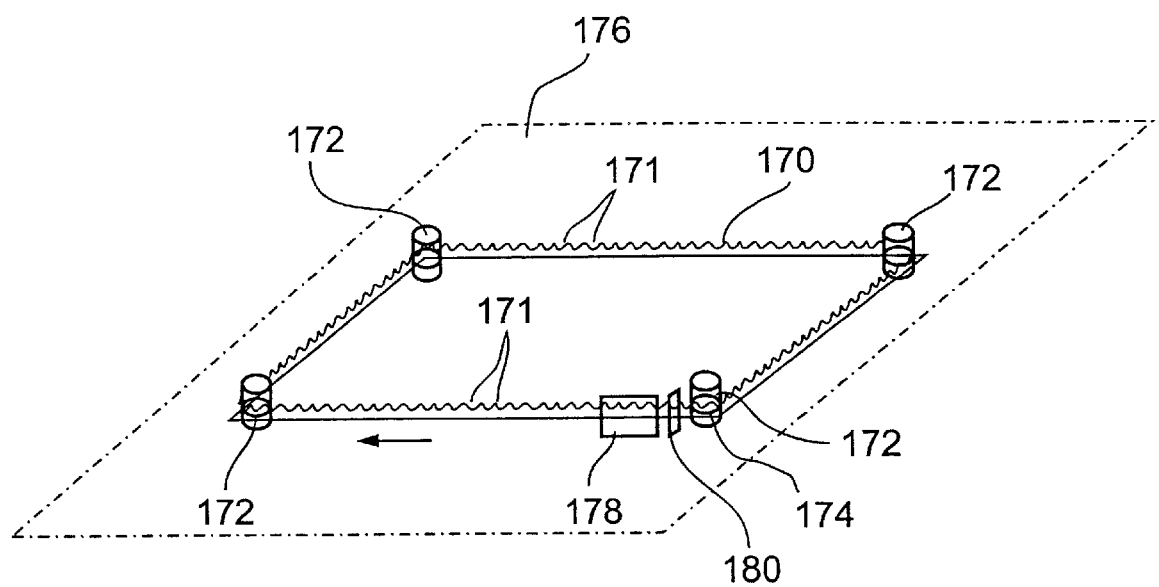
FIG. 15 is a perspective view of yet another mechanism for forming a surface on the liquefied polymer of sufficiently high curvature which includes a rotateable strap of a conductive material formed with a plurality of protrusions rotating in parallel to the precipitation electrode.

As shown in FIG. 15, according to yet another preferred embodiment of the present invention, a mechanism for forming a surface on the liquefied polymer of sufficiently high curvature to cause at least one jet of the liquefied polymer to be drawn by the electrical potential to the precipitation electrode includes a rotateable strap 170 of a conductive material, formed with a plurality of protrusions 171, rotating around at least two shafts 172 and connected to a source 174. Protrusions 171 are pointed at a direction of a precipitating electrode 176, such that when strap 170 is rotated through a reservoir 178 including a liquefied polymer, aliquots thereof accumulate over protrusions 171 to thereby generate the a surface on the liquefied polymer of sufficiently high curvature to cause at least one jet of the liquefied polymer to be drawn to precipitation electrode 176. Since the field is oriented perpendicular to the direction of rotation of strap 170, strap 170 can be rotated at higher speeds, resulting in even more homogenous polymer fiber distribution over electrode 176. According to a preferred embodiment, just before entering reservoir 178, strap 170 is wiped from remnants of polymer by a wiper 180, made, for example, of an adsorbing material.

Thus, the distance between the rotating strap and the precipitation electrode is constant at all locations, so that the electric field intensity experienced at each location is similar, resulting in more uniform fiber thickness. Furthermore, since there is no centrifugal force in the direction of the precipitation electrode, it is possible to increase the speed of the rotating strap to thereby improve mass distribution and productivity.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A device for transforming a liquefied polymer into a fiber structure, comprising:

(a) a precipitation electrode;

(b) a first mechanism for charging the liquefied polymer to a first electrical potential relative to said precipitation electrode; and (c) a second mechanism including at least one rotating wheel having a rim formed with a plurality of protrusions for forming a curved surface on said liquefied polymer to cause at least one jet of the liquefied polymer to be drawn by said first electrical potential to said precipitation electrode;

wherein said first and second mechanisms are designed such that when a plurality of fibers are precipitated on said precipitation electrode, a high efficiency particulate air unwoven fiber structure, capable of filtering out at least 99.97% of 0.3 $\mu$m particulates in air flowing at 5 cm/sec is obtainable;

wherein said second mechanism includes at least one rotating wheel having a rim formed with a plurality of protrusions; and wherein each of said protrusions is formed with a liquefied polymer collecting cavity.

2. The device of claim 1, wherein said first mechanism for charging the liquefied polymer to a first electrical potential relative to said precipitation electrode includes in combination:

(i) a voltage source; and (ii) a charge control agent mixed with the liquefied polymer.

3. The device of claim 2, wherein said first mechanism for charging the liquefied polymer to a first electrical potential relative to said precipitation electrode further includes:

(iii) a source of ionized air being in contact with said liquefied polymer.

4. The device of claim 1, wherein each of said at least one wheel is tilted with respect to said precipitation electrode.

5. A device for transforming a liquefied polymer into a fiber structure, comprising:

(a) a precipitation electrode;

(b) a first mechanism for charging the liquefied polymer to a first electrical potential relative to said precipitation electrode; and (c) a second mechanism including at least one rotating wheel having a rim formed with a plurality of protrusions for forming a curved surface on said liquefied polymer to cause at least one jet of the liquefied polymer to be drawn by said first electrical potential to said precipitation electrode;

wherein said first and second mechanisms are designed such that when a plurality of fibers are precipitated on said precipitation electrode, a high efficiency particulate air unwoven fiber structure, capable of filtering out at least 99.97% of 0.3 $\mu$m particulates in air flowing at 5 cm/sec is obtainable;

wherein said second mechanism is effected by at least one rotating wheel having a rim formed with a plurality of protrusions; and wherein each of said at least one wheel includes a dielectric core.

6. A device for transforming a liquefied polymer into a fiber structure, comprising:

(a) a precipitation electrode;

(b) a first mechanism for charging the liquefied polymer to a first electrical potential relative to said precipitation electrode; and (c) a second mechanism for forming a curved surface on said liquefied polymer to cause at least one jet of the liquefied polymer to be drawn by said first electrical potential to said precipitation electrode;

wherein said first and second mechanisms are designed such that when a plurality of fibers are precipitated on said precipitation electrode, a high efficiency particulate air unwoven fiber structure, capable of filtering out at least 99.97% of 0.3 $\mu$m particulates in air flowing at 5 cm/sec is obtainable; and wherein said second mechanism includes a gas bubble generating mechanism.

7. A device for transforming a liquefied polymer into a fiber structure, comprising:
   (a) a precipitation electrode;
   (b) a first mechanism for charging the liquefied polymer to a first electrical potential relative to said precipitation electrode; and
   (c) a second mechanism for forming a curved surface on said liquefied polymer to cause at least one jet of the liquefied polymer to be drawn by said first electrical potential to said precipitation electrode;
   wherein said first and second mechanisms are designed such that when a plurality of fibers are precipitated on said precipitation electrode, a high efficiency particulate air unwoven fiber structure, capable of filtering out at least 99.97% of 0.3 $\mu$m particulates in air flowing at 5 cm/sec is obtainable; and
   wherein said second mechanism includes a rotating strap formed with a plurality of protrusions.

8. The device of claim 6, wherein said precipitation electrode is operative to move past said second mechanism for forming said curved surface.

9. The device of claim 8, wherein said precipitation electrode includes a belt.

10. The device of claim 6, wherein said second mechanism for forming said curved surface includes at least one nozzle.

11. The device of claim 6, wherein said second mechanism for forming said curved surface includes at least one protrusion made of a material which is wetted by the liquefied polymer, said at least one protrusion including a tip whereon said curved surface is formed.

12. The device of claim 11, wherein said at least one protrusion is disposed on a rim of a wheel with said tip pointing radially outward from said wheel.

13. The device of claim 11, further comprising:
   (d) a bath for holding the liquefied polymer;
   wherein said at least one protrusion is operative to reciprocate within said bath, said jets of the liquefied polymer being formed at a closest approach of said at least one protrusion to said precipitation electrode.

14. A device for transforming a liquefied polymer into a fiber structure, comprising:
   (a) a precipitation electrode;
   (b) a first mechanism for charging the liquefied polymer to a first electrical potential relative to said precipitation electrode; and
   (c) a second mechanism for forming a curved surface on said liquefied polymer to cause at least one jet of the liquefied polymer to be drawn by said first electrical potential to said precipitation electrode;
   wherein said first and second mechanisms are designed such that when a plurality of fibers are precipitated on said precipitation electrode, a high efficiency particulate air unwoven fiber structure, capable of filtering out at least 99.97% of 0.3 $\mu$m particulates in air flowing at 5 cm/sec is obtainable; and
   (d) an additional electrode, intermediate between said precipitation electrode and said second mechanism for forming said surface of high curvature.

15. The device of claim 14, wherein opposite said mechanism for forming said curved surface said additional electrode includes a plate having an aperture, through which said at least one jet of the liquefied polymer emerge towards said precipitation electrode.

16. A device for transforming a liquefied polymer into a fiber structure, comprising:
   (a) a precipitation electrode;
   (b) a first mechanism for charging the liquefied polymer to a first electrical potential relative to said precipitation electrode; and
   (c) a second mechanism for forming a curved surface on said liquefied polymer to cause at least one jet of the liquefied polymer to be drawn by said first electrical potential to said precipitation electrode;
   wherein said first and second mechanisms are designed such that when a plurality of fibers are precipitated on said precipitation electrode, a high efficiency particulate air unwoven fiber structure, capable of filtering out at least 99.97% of 0.3 $\mu$m particulates in air flowing at 5 cm/sec is obtainable; and
   (d) an aerosol generator operative to supply an aerosol to said precipitation electrode at a second electrical potential difference from said precipitation electrode opposite in sign to said first electrical potential difference.

17. The device of claim 16, wherein said aerosol generator includes:
   (i) a pressure chamber; and
   (ii) a partition between said pressure chamber and said precipitation electrode;
   said pressure chamber and said partition cooperating to fluidize a filler powder which is drawn by said second electrical potential difference to said precipitation electrode.

18. The device of claim 16, wherein said aerosol generator includes a slot sprayer.

\* \* \* \* \*